United States Patent [19]

Fries

[11] Patent Number: 5,412,025
[45] Date of Patent: May 2, 1995

[54] METHOD TO REACTOR-FILL POLYOLEFINS BY EMPLOYING A STICKY PREPOLYMER AS A BLENDING AND COMPATIBILIZING AGENT

[75] Inventor: Richard W. Fries, Joliet, Ill.

[73] Assignee: Quantum Chemical Corporation, Cincinnati, Ohio

[21] Appl. No.: 114,031

[22] Filed: Aug. 30, 1993

[51] Int. Cl.⁶ .......................... C08K 5/05; C08K 3/22; C08K 3/34; C08K 3/04
[52] U.S. Cl. ..................... 524/765; 524/730; 524/786; 524/700; 526/119; 523/129
[58] Field of Search ............... 524/765, 786, 730; 526/119, 35; 523/129

[56] References Cited

U.S. PATENT DOCUMENTS

| | | | |
|---|---|---|---|
| 3,950,303 | 4/1976 | Lipscomb | 260/42.14 |
| 4,004,071 | 1/1977 | Aishima et al. | 252/429 |
| 4,104,243 | 8/1978 | Howard, Jr. | 260/42.14 |
| 4,151,126 | 4/1979 | Adelman et al. | 252/508 |
| 4,187,210 | 2/1980 | Howard, Jr. | 264/292 |
| 4,366,296 | 12/1982 | Kitagawa et al. | 526/77 |
| 4,374,753 | 2/1983 | Pullukat et al. | 502/104 |
| 4,473,672 | 9/1984 | Bottrill | 523/215 |
| 4,530,913 | 7/1985 | Pullukat et al. | 502/104 |
| 4,564,647 | 1/1986 | Hayashi et al. | 523/211 |
| 4,866,021 | 9/1989 | Miro et al. | 502/113 |
| 4,950,631 | 8/1990 | Buehler et al. | 502/119 |
| 5,034,483 | 7/1991 | Miro et al. | 526/116 |
| 5,098,969 | 3/1992 | Buehler et al. | 526/119 |

OTHER PUBLICATIONS

"Polymerization of Ethene by Ziegler Catalysts in the Presence of Fillers", Schoppel, et al., Makromol. Chem., Rapid Commun., vol. 3, pp. 483–488 (1982).

Primary Examiner—Kriellion S. Morgan
Attorney, Agent, or Firm—William A. Heidrich; Gerald A. Baracka

[57] ABSTRACT

The present invention relates to a process to in-situ reactor-fill polyolefins. More specifically, the instant invention provides a process to reactor-fill polyolefins comprising the steps of (a) adding a sufficient amount of alpha-olefin to a filler prior to using the filler for in-situ polymerization; (b) prepolymerizing the mixture of step (a) by contacting the treated filler in random order of no specific sequence with a high activity polymerization catalyst, a cocatalyst, and, if necessary a cocatalyst modifier; and (c) adding an alpha-olefin under olefin polymerization reaction conditions to the reaction product of step (b) to form a reactor-filled composite. The prepolymerization step results in the formation of a sticky prepolymer on the surface and in the pores of the filler.

The present invention further relates to reactor-filled polyolefin composites obtained from the process of the present invention. The reactor-filled polyolefin composites produced by the instant invention are characterized as containing low levels of fines and having a relatively uniform distribution of filler material dispensed throughout the composite matrix.

35 Claims, No Drawings

METHOD TO REACTOR-FILL POLYOLEFINS BY EMPLOYING A STICKY PREPOLYMER AS A BLENDING AND COMPATIBILIZING AGENT

FIELD OF THE INVENTION

The present invention provides a method to reactor-fill polyolefins by employing a sticky prepolymer as a blending and/or compatibilizing agent. More specifically, the present invention relates to a method to reactor-fill polyolefins comprising the steps of (a) adding a sufficient amount of at least an alpha-olefin to a filler such that a sticky prepolymer can be formed in-situ; (b) prepolymerizing the reaction mixture of step (a) by contacting said mixture in no specific order with a high activity catalyst, a cocatalyst, and, if necessary a cocatalyst modifier such that said contacting results in the formation of a prepolymer on the surface and in the pores of the filler; and (c) adding an alpha-olefin under olefin polymerization reaction conditions to the reaction product of step (b) to form a reactor-filled composite characterized as having a high filler content and high melt flow rate. Moreover, the addition of the alpha-olefin to the filler causes the filler particles to blend in-situ with the matrix composite resulting in a more uniformly blended composite product.

The present invention further relates to reactor-filled polyolefin composites obtained from the process of the present invention. The reactor-filled polyolefin composites produced by the instant invention have a relatively uniform distribution of filler particles blended therein and are essentially free of fines. In addition, the resultant reactor-filled polyolefin composites of the present invention exhibit high melt flow rates since the prepolymer behaves similar to a plasticizer.

BACKGROUND OF THE INVENTION

The use of organic polymers in numerous applications has grown in recent years to the degree that rigid polymers such as nylons and polyacetal resins have almost replaced the more conventional metal, wood, and ceramic materials. The development of low cost and efficient methods of preparing polyolefins has made them excellent candidates for a wider range of applications provided that certain physical properties such as heat distortion temperature, stiffness and hardness can be improved.

In recent years, much research has been conducted in the field to develop various methods for improving the physical properties of polyolefins. A vast majority of this research has been directed towards filling polyolefins with finely divided solids or fibrous fillers. One such method of providing filled polyolefins is by melt mixing the polyolefin with the filler material. This procedure, however, requires that the polyolefin be of relatively low molecular weight, that is, have an inherent viscosity less than about 1. While the resulting polymeric products produced by this method generally have increased stiffness, they do suffer from the disadvantage of lower elongation and increased brittleness.

Furthermore, serious problems of compounding these polymers prepared by melt mixing are encountered including the large power requirements for mixing machinery, degradation of the polymers by heating, nonuniformity of filler dispersion, and poor adhesion of the polymer to the filler, even when coupling agents are employed.

Recently, various methods have been proposed and developed to decrease the problems mentioned above, the most widely used method being the polymerization of an olefin in the presence of selected fillers. One suggested method of effecting olefin polymerization on the filler is by employing a coordination catalyst. In this method, well-known coordination catalysts comprising the combination of transition metal halides and esters and a reducing compound such as an organometallic compound of a metal of Group Ia, IIa or IIIa of the Periodic Table of Elements are generally employed. This method in general, however, has not provided toughness in highly filled polyolefin composition.

Another method of improving the physical properties of polyolefins using a filler material is disclosed in U.S. Pat. No. 3,950,303 to Lipscomb. This reference describes a process for polymerizing olefins onto a chromium-modified filler in the presence of an organometallic compound. Moreover, the process disclosed by Lipscomb involves (a) contacting an inorganic filler material with a solution of a chromium(III) compound whereby the chromium compound is adsorbed onto the surface of the filler; (b) activating the chromium-modified filler by drying; (c) dispersing the filler as a slurry in an inert, liquid hydrocarbon; (d) adding an organoaluminum compound to said slurry; and (e) polymerizing an olefin in said slurry. This method is said to result in the formation of an essentially homogeneous, filled polyolefin composition having a good combination of hardness, toughness and stiffness.

U.S. Pat. No. 4,104,243 to Howard, Jr. relates to a process for preparing low viscosity inorganic filler compound dispersions and the use of the same in the preparation of polyolefin/inorganic filler compositions. More specifically, the process as described in the reference involves dispersing a large amount of a finely divided inorganic filler compound as a slurry in an inert hydrocarbon diluent in the presence of an organoaluminum compound. This dispersion may then by contacted with a transition metal polymerization catalyst and an olefin to produce a polyolefin/filler composition.

U.S. Pat. No. 4,473,672 to Bottrill relates to a process of producing a polymer composition which is a composite material containing an olefin polymer and a filler. Moreover, the patentee discloses a polymer composite which is produced by polymerizing an olefin monomer in the presence of a catalyst system obtained by reacting a filler material with (a) an organic magnesium compound which contains a halogen or (b) an organomagnesium compound and thereafter with a halogen-containing compound; and then treating that reaction product with a transition metal compound, which is preferably $TiCl_4$, and an organic activating compound. The resultant homogeneous composites are said to have good flow characteristics.

This method disclosed by Bottrill, however, suffers from the disadvantage that the composite will contain a halogen, therefore, it is necessary to carry out a deashing step. The use of a deashing step is undesirable since those skilled in the art are aware that halogens can adversely affect the polymer product as well as cause corrosion of the machinery used to process the final product.

One such method of overcoming the deashing problem described above is disclosed in U.S. Pat. No. 4,564,647 to Hayashi et al. which relates to a process for producing a polyethylene composition which comprises polymerizing ethylene in the presence of a catalyst comprising a contact treatment product of a high activity catalyst component, a filler and an organoaluminum compound. This process has no need for a deashing step since the catalyst employed has a remarkably high activity even though the catalyst contains very low amounts of a halogen.

Schöppel et al., Makromal. Chem., Rapid Commun. Vol 3, (1982), pp. 483–488 provides a procedure which leads to filled polymers with strong polymer-filler interactions by fixing one component of the catalyst onto the surface of the filler. The reference typically uses $TiCl_4$ as a fixing agent and the catalysts are normal Ziegler catalysts such as $Mg(OEt)_2/TiCl_4/Al(iBu)_3$. The procedure described by Schöppel et al. is said to result in high catalyst activity compared with prior art systems.

Despite the current state of the art, none of the references disclosed hereinabove relate to the current method of in-situ filling of polyolefins. That is, none of the references disclosed hereinabove relate to a method to reactor-fill polyolefin comprising the steps of (a) adding a sufficient amount of at least one alpha-olefin to a filler such that a sticky prepolymer can be formed in-situ; (b) prepolymerizing the reaction mixture of step (a) by contacting said mixture in no specific order with a high activity catalyst, a cocatalyst and, if necessary, a cocatalyst modifier wherein said contacting step causes the formation of a sticky prepolymer on the surface and in the pores of the filler; and (c) adding an alpha-olefin under olefin polymerization reaction conditions to the reaction product of step (b) to form a reactor-filled composite having a high filler content and high melt flow. The addition of the alpha-olefin to the filler causes the filler particles to blend in-situ with the matrix polymer and results in a fewer number of fines in the composite product.

SUMMARY OF THE INVENTION

The present invention relates to a method to reactor-fill polyolefins by employing a sticky prepolymer as a blending and/or compatibilizing agent. Moreover, the process of the present invention involves first adding a sufficient amount of at least one alpha-olefin to a filler prior to using the filler for in-situ filled polymerization with a high activity polymerization catalyst system. This reaction mixture containing the filler and the alpha-olefin is then prepolymerized by contacting it in no specific order with a high activity catalyst, a cocatalyst, and if necessary, a cocatalyst modifier. This prepolymerization step results in the formation of a sticky prepolymer on the surface and in the pores of the filler. An alpha-olefin is then added to the abovereaction product under olefin polymerization conditions to cause the formation of a reactor-filled composite having a relatively uniform dispersion of filler particles dispersed therein.

In another aspect, the present invention also relates to reactor-filled polyolefin composites obtained by the inventive method of in-situ reactor-filling polyolefins. The resultant reactor-filled polyolefin composites obtained by the inventive method are characterized as having a high filler content and reduced fines. More importantly, the reactor-filled polyolefin composites of the present invention have a uniform distribution of filler particles blended therein. Moreover, the reactor-filled composites of the present invention exhibit a high melt flow since the prepolymer acts like a plasticizer. Thus, the reactor-filled polyolefin composites of the present invention are suitable for a variety of different applications, such as U.V. stabilizers, flame retardants, wires and cables and the like. Moreover, the reactor-filled composites are useful in applications wherein high flexural modulus, impact strength and tensile strength is desired.

DETAILED DISCUSSION OF THE INVENTION

In accordance with the inventive method, a filler material is initially contacted with a sufficient amount of an alpha-olefin such that a sticky prepolymer is produced on the surface and in the pores of the filler material.

The fillers employed by the present invention are any of the conventional fillers which are well known and established in the art. Suitable fillers employed by the present invention include, but are not limited to, mica, talc, $CaCO_3$, kaolin, $Mg(OH)_2$, clay, diatomaceous earth, $CaSO_4$ (amorphous and acicular), fly ash, silica, glass spheres and fibers, polyvinyl alcohol, graphite, carbon black, titanium dioxide, aluminum, copper and the likes thereof. Of these fillers, talc, mica and kaolin are particularly preferred.

Moreover, the fillers employed in the present invention are characterized as having a surface area of about 0.1 $m^2$/gm to about 500 $m^2$/gm and a median particle size of about 0.5 microns to about 50 microns.

In a preferred embodiment of the instant invention, the filler is dried and deoxygenated prior to treatment with an alpha-olefin to remove any surface hydroxyl groups which may inhibit the formation of a sticky prepolymer on the surface and in the pores of the filler.

To cause effective removal of hydroxy groups from the surface of the filler, the filler is dried in an inert atmosphere at temperatures of at least 50 to about 150° C. for a period of at least about 0.5 to about 72 hrs. More preferably, drying of the filler is performed in an oven at a temperature range from about 100 to about 150° C. for a period of about 10 to about 24 hrs. in an inert gas atmosphere, such as nitrogen or argon.

The deoxygenating process can be carried out by evacuating the system under full vacuum and then refilling the system with moisture-free nitrogen at room temperature. This process of evacuating and refilling with $N_2$ can be repeated from about 3 to about 6 times. The deoxygenating process may also be carried out by flowing moisture-free nitrogen over the dried filler material for a time period of about 0.5 to about 24 hrs at a temperature of about 25 to about 150° C.

The dried, deoxygenated filler is then contacted with a sufficient amount of an alpha-olefin such that a sticky prepolymer can be formed on the surface and in the pores of the filler. The alpha-olefins useful in the present invention include alpha-olefins having from two to eighteen carbon atoms such as ethylene, propylene, butene, pentene, and mixtures thereof. Of these alpha-olefins decene is most particularly preferred.

The amount of alpha-olefin added to the filler which is needed to initiate the formation of a prepolymer on the surface and in the pores of the filler is from about 0.01 to about 10,000 μmol per gram of filler. More preferably, the concentration range of the alpha-olefin added to the filler is from about 100 to about 1000 μmol per gram of filler.

The addition of the alpha-olefin to the filler may be conducted neat or in a hydrocarbon solvent which may be either liquid or gaseous under the conditions employed by the present invention. It is a preferred embodiment of the present invention that the alpha-olefin be solubilized in a liquid hydrocarbon solvent.

The hydrocarbon solvents employed in the present invention to solubilize the alpha-olefin can be any aliphatic or aromatic hydrocarbon solvents containing from 4 to 15 carbon atoms. In a preferred embodiment, aliphatic hydrocarbon solvents such as isobutane, pentane, hexane, heptane, cyclohexane and the like are used to solubilize the alpha-olefin. Of these hydrocarbon solvents, heptane is most preferred.

Prior to use, the hydrocarbon solvents should be purified, e.g. by percolation through silica gel and/or molecular sieves to remove trace quantities of water, oxygen, polar compounds, and other materials capable of adversely affecting the formation of a sticky prepolymer on the filler.

Furthermore, all of the contacting steps described herein are carried out in inert atmosphere, such as nitrogen; thus, preventing any air or moisture to come into direct contact with the alpha-olefin and/or the filler.

This contact between the alpha-olefin and the filler occurs at a temperature from about 0° to about 100° C. More preferably, the temperature of this contacting step is from 0° to about 50° C. Most preferably, the temperature is from about 20 to about 30° C.

The time employed for the treatment of the filler with the alpha-olefin is from about 0.01 to about 100 hrs. Most preferably, the time of this treatment step is from about 0.1 to about 1 hrs.

The above reaction product is then prepolymerized by contacting the mixture of the filler and alpha-olefin in random order of no specific sequence with a high activity polymerization catalyst, if necessary, a modifying compound(s) and at least one cocatalyst component. This prepolymerization process results in the formation of a sticky prepolymer on the surface and in the pores of the filler. The sticky prepolymer that is formed in-situ acts as a blending and/or compatibilizing agent which results in the production of a composite product having a reduced number of fines dispensed therein. By reduced number of fines, we mean that the reactor-filled composites contain less than about 1% of fines which have an average particle size of less than 45 microns.

The high activity polymerization catalysts employed by the present invention are solid catalyst components as described in coassigned U.S. Pat. Nos. 4,374,753, 4,950,631, and 5,098,969 the contents of which are incorporated herein by reference. Moreover, the high activity catalyst employed by the present invention is a solid catalyst which is effective in alpha-olefin polymerization reactions. The term high activity catalyst as used herein means any catalyst which is able to produce an isotactic polymer product or a high density polyethylene polymer.

The preferred high activity catalyst utilized in the present invention is prepared by initially contacting a support either inorganic, such as silica, or organic, such as a polyolefin, with at least one organomagnesium compound and, as appropriate, a modifying compound or an alcohol. The modifying compound is employed herein when a polypropylene polymer is desirable whereas an alcohol is used when a polyethylene polymer is desirable.

A preferred support is silica that has a high surface area and high pore volume. The silica employed in the current catalyst system is preferably pure however, it may contain minor amounts of other inorganic oxides. In general, the silica support comprises at least 90%–95% by weight pure silica. In one preferred embodiment the silica is at least 99% pure.

The silica support utilized in the preparation of the catalyst, is preferably a high surface area, high pore volume material defined by a surface area between 50 $m^2/g$ and about 500 $m^2/gm$; a median size of about 20 microns to about 200 microns and a pore volume of about 0.5 cc/gm to about 3.0 cc/gm as determined by Standard B.E.T. measurements.

It is a preferred embodiment of the invention that the silica support be pretreated prior to its use to remove any impurities or surface hydroxyl groups which may inhibit the activity of the resultant catalyst component.

To cause effective removal of surface hydroxyl groups from the surface of the silica support, the silica may be calcined in an inert atmosphere at a temperature of at least 150° C. Preferably, calcination of the silica is performed in the temperature range from about 150° C. to about 650° C. in an inert gas atmosphere, i.e. nitrogen or argon.

Another method of removing surface hydroxyl groups involves contacting the silica with a hexaalkyl disilazane or chlorosilanes as disclosed in U.S. Pat. No. 4,530,913 of Pullukat et al., for example. Of the hexaalkyl disilazane useful in this application, hexamethyl disilazane, i.e., H.M.D.S., is particularly preferred.

The silica may also be pretreated by combining the calcination method and treatment with a hexalkyl disilazane. In this method, the sequence of pretreatment may be random; however, it is a preferred embodiment that the hexaalkyl disilazane treatment precede the calcination process.

The pretreated silica is then reacted with an organomagnesium compound which is soluble in organic solvents. The organomagnesium compounds useful in the present invention are the alkyls, alkoxides or aryls of magnesium or its complexes such as complexes with alkyl aluminum compounds. The structural formulas of some of the preferred organomagnesium compounds are $R^2MgX_1$, $R'_2Mg$ and $(R_2^2Mg)_nAlR_3^2$ where $R'$ and $R^2$ are each independently an alkyl or alkoxide containing from about 1 to about 12 carbon atoms or aryls such as phenyl, naphthyl, and cyclopentadienyl; n is 0.5–10, and X is a halide such as chloride or bromide. Complexes of organomagnesium compounds with organoaluminum halides can also be used. The complexes may contain small amounts of alkoxide. Of the organomagnesium compounds contemplated herein, alkoxymagnesium chlorides are most particularly preferred.

The magnesium-aluminum complex is well known in the art, as disclosed in Aishima et al., U.S. Pat. No. 4,004,071 at column 2, lines 34–40 and column 3, lines 30–36. The complex is prepared according to the teachings of Ziegler et al., Organometallic Compounds XXII: Organomagnesium-Aluminum Complex Compounds, Annalen der Chemie, 605, pp. 93–97 (1957).

The amount of organomagnesium compound added to make the solid catalyst component of the present invention is from about 0.01 to about 5 mmol per gram of silica. More preferably, the concentration range of the organomagnesium compound is from about 0.6 to about 1.25 mmol per gram of $SiO_2$.

The reaction mixture containing the organomagnesium compound and silica may then be optionally treated with an alcohol. Such treatment with an alcohol is employed when a polyethylene polymer is desirable. Suitable alcohols include aliphatic or aromatic alcohols containing from about 1 to about 12 carbon atoms. In a preferred embodiment of the present invention, the alcohol is an aliphatic alcohol containing from 1 to 5 carbon atoms. Of these preferred alcohols, n-butyl alcohol is particularly preferred.

The amount of alcohol added to the reaction mixture is from about 0 to about 5 mmol per gram of silica. More preferably, the concentration range of alcohol is from about 0.5 to about 1.25 mmol per gram of silica.

The modifying compounds that may be optionally employed by the present invention as a catalyst component are silanes having the formula $SiH_rX_s^2$, where $X^2$ is halogen; r is 0 or an integer of 1 to 3; and s is an integer from 1 to 4; with the proviso that the sum of r and s is 4. These modifying compounds are added to the reaction mixture containing the organomagnesium compound and the silica and are employed when a polypropylene polymer is desirable. Suitable silanes having the above formula include silicon tetrachloride, trichlorosilane, tribromosilane, dichlorosilane, dibromosilane and mixtures thereof. Of these silanes, silicon tetrachloride is most particularly preferred.

The concentration of the modifying compound employed by the present invention as a catalyst component is from about 0.01 to about 5 mmol per gram of silica. More preferably, the molar ratio of the modifying compound to silica is from about 0.6 to about 1.25 mmol per gram of $SiO_2$.

The contacting step between the silica and the soluble organomagnesium compound(s) usually occurs at a temperature in the range of between about 15° C. and about 120° C. More preferably, this contact occurs at a temperature in the range of between about 50° C. and 110° C. The contact occurs over a period of between about 30 minutes and about 4 hours. Preferably, the contact occurs over a period of between about 1 hour and about 3½ hours. Still more preferably, this contact occurs over a period of between about 1½ hours and about 2½ hours.

The organic solvent employed to solubilize the organomagnesium compounds can be any aliphatic or aromatic hydrocarbon solvents mentioned previously hereinabove.

In yet another preferred embodiment, the reaction product of the magnesium component and silica component is then dried under precisely defined conditions until most of the heptane solvent is removed. The drying process utilized by the present invention has been previously described in copending and coassigned patent applications U.S. Ser. No. 854,199 filed Mar. 20, 1992, (now U.S. Pat. No. 5,221,650) and U.S. Ser. No. 984,052 filed Nov. 30, 1992, (now U.S. Pat. No. 5,275,991) the contents of which are incorporated herein by reference. This drying process is effective in providing effective wetting of the surface area of said compound such that a regular essentially continuous distribution of accessible magnesium values is present on the support material for further reaction. The process provides a statistically averaged surface coverage of magnesium values of about 1 to about 3 layers.

Typically, drying will be conducted under an atmosphere of and with a slow purge e.g. 10 ml/min. of nitrogen; in small volumes the granular coated support may be dried in a paddle stirred container with heat supplied from an external source.

The solid product containing the organomagnesium compound is then reacted with at least one or more transition metal compounds belonging to Groups IVB and/or VB or the Periodic Table.

The transition metal compounds belonging to Group IVB of the Periodic Table have the structure formula $M'X^2_p(OR')_q$ wherein M' is titanium or zirconium; R' is aryl, alkyl, aralkyl, cycloalkyl or alkylsilyl; $X^2$ is a halogen; p is an integer from 1 to 4; and q is 0 or an integer from 1 to 3; with the proviso that the sum of p and q is 4. It is especially preferred that M' be titanium.

In the preferred embodiment, the titanium-containing compound is characterized as "p" being an integer from 2 to 4 and q is 0 or an integer 1 or 2. Suitable titanium compounds within the contemplation of this embodiment are titanium tetrachloride, titanium tetrabromide, methoxytitanium trichloride, ethoxytitanium trichloride, diethoxytitanium dichloride and the like.

Still, more preferably, the titanium-containing compound is defined by "p" being 4, "q" being 0, and $X^2$ is chlorine or bromine. Thus, the titanium compound is most preferably titanium tetrachloride or titanium tetrabromide. Of these two titanium compounds, titanium tetrachloride is most preferred.

Suitable transition metal compound belonging to Group VB are compounds that have the structural formula $M''(OR')_x(O)_y(X^2)_z$ wherein M'' is a metal of Group VB; R' is a hydrocarbyl having from 1 to 18 carbon atoms; $X^2$ is halogen; x is 0 or an integer from 1 to 5; and y is 0 or 1; and z=(5-x-2y) or 4 or 3 when x=0, y=0. It is especially preferred that M'' be vanadium.

Suitable vanadium compounds encompassed by the above formula include vanadium oxyhalides, vanadium alkoxides, vanadium carboxylates, vanadium halides and mixtures thereof. It is especially preferred that the vanadium-containing compound be vanadium tributyloxy, triisobutyl vanadate, vanadium tetrachloride, and the like thereof.

This contact between the transition metal-containing compounds and the organomagnesium-containing solid product occurs at a temperature from about 0° to about 100° C. More preferably, the temperature of this contacting step is from 20° to about 100° C. Most preferably, the temperature is from about 25° to about 50° C.

The time employed for contacting the solid product with the transition metal-containing compounds is from about 0.25 to about 4 hrs. Most preferably, the time of this contacting step is from about 0.25 to about 1 hr.

The concentration range of transition metal-containing compound (Tm) employed by the present invention is from about 0.01 to about 5 mmol of transition metal compound per gram of silica. More preferably, the concentration of transition metal compound used in this contacting step is from about 0.05 to about 1.0 mmol of transition metal compound per gram $SiO_2$.

It should be appreciated that all the treatment steps in the formation of the high activity catalyst component of this invention, the contact of silica with the organomagnesium compound and the transition metal compounds, involve contact between a solid, silica, and a liquid. This is because each of the compounds that are contact with the silica are liquids or are soluble in an inert hydrocarbon solvent under the conditions employed by the present process. As such, no ball-milling or other solid mixing is required. Ball-milling is an expensive and difficult operation, usually in the formation of polymerization catalysts of the prior art; it is thus eliminated. Those skilled in the art are aware, in the case where a hydrocarbon is employed, that the solvent may be allowed to remain with the reaction mass or can be removed by decantation, filtration, evaporation, or the like.

The cocatalyst components employed by the present invention are conventional aluminum-containing cocatalysts well known in the art.

The aluminum-containing cocatalysts are preferably alkylaluminum-containing compounds. Alkylaluminum-containing compounds suitable for the present process include trialkylaluminum, alkylaluminum halide, alkylaluminum hydride, aluminoxane (either cyclic or linear) or mixtures thereof. More preferably, the cocatalyst is a trialkylaluminum compound. Of the trialkylaluminum compounds triethylaluminum is particularly preferred.

The molar ratio of aluminum-containing cocatalyst to high activity catalyst component is from about 0.1 to about 100. More preferably, the molar ratio of cocatalyst to high activity catalyst is from about 10 to about 100.

The cocatalyst modifiers that may be optionally employed by the present invention are required when a polymer of polypropylene is being produced. The cocatalyst modifiers of this invention are hydrocarbyl alkoxysilanes. Preferred hydrocarbyl alkoxysilanes include hydrocarbyl trialkoxysilanes, dihydrocarbyl dialkoxysilanes and trihydrocarbyl alkoxysilanes. Of the hydrocarbyl trialkoxysilanes, those preferred involve a hydrocarbyl having the meaning phenyl and $C_1$–$C_6$ alkyl; and $C_1$–$C_{10}$ trialkoxy. Particularly preferred species include hexyltrimethoxysilane, amyltriethoxysilane and isobutyltrimethoxysilane.

The reaction mixture containing the filler, alpha-olefin, high activity catalyst, cocatalyst and, if necessary, cocatalyst modifier is then prepolymerized at a temperature from about 0° to about 100° C. for a period of time sufficient to form a prepolymer on the surface of the filler. More preferably, the prepolymerization step of the inventive method is conducted of a temperature from about 20° to about 30° C. for a period of about 0.01 to about 24 hr. Most preferably, the prepolymerization step is conducted at a temperature of about 25° C. for about 0.1 hrs.

The reaction mixture obtained above containing the prepolymer is then contacted under alpha-olefin polymerization conditions with an appropriate alpha-olefin. Alpha-olefins suitable in this reactor-filled method include alpha-olefins containing from two to twelve carbon atoms such as ethylene, propylene, butene, pentene, and the like. Mixtures of these alpha-olefins are also contemplated herein.

In a particularly preferred embodiment of the present invention, the olefin polymerized is propylene.

In this preferred embodiment, polymerization of propylene occurs at a temperature in the range of between about 40° C. and 250° C. More preferably, the temperature of this reaction is in the range of about 50° C. and about 150° C. The pressure of the propylene polymerization reaction is in the range of between about 50 psig and about 1000 psig, more preferably between about 100 psig and about 700 psig. In a preferred embodiment the propylene polymerization occurs in the presence of hydrogen gas.

In another aspect the present invention relates to reactor-filled polyolefin composites obtained from the present method. The reactor-filled composites produced by employing the reactor-filled method of the present invention are characterized as having improved physical properties such as melt index, as well as rheological properties such as flexural modulus compared to an unfilled polymer or a composite obtained using prior art systems. Moreover, the reactor-filled composites produced herein have a relatively uniform distribution of filler particles blended throughout the composite matrix and fewer fines in the final composite compared to prior art composites. The filler particles may be powdery, fibrous, pulverized, spherical or granular in shape. Additionally, the composites produced by the present invention contain a high filler content.

Furthermore, since the melt index of the polyolefin composite blend can be controlled by the matrix polymer formed in-situ, materials useful for injection molding and compression molding are obtained by the present invention. In contrast, prior art reactor-filled composites are mostly suitable for compression molding processes.

The following examples are given to illustrate the scope of the present invention. Because these examples are given for illustrative purposes only, the invention embodied therein should not be limited thereto.

EXAMPLES 1–17

Reactor-Filling During Propylene Polymerization

Into a one liter autoclave was added 20 ml of heptane and an appropriate amount of an alpha olefin as described in Table I. To this solution was added an appropriate amount of filler material as defined in Table I. The fillers employed herein were previously dehydrated in an oven at 100° C. for 8 hrs and then deoxygenated by evacuating the system and refilling with moisture-free nitrogen at room temperature. This deoxygenation process was repeated 6 times. A premixed cocatalyst and catalyst modifier as described in U.S. Pat. No. 5,098,969 were than added to the above mixture to form a slurry. More specifically, an isobutyl isopropyl dimethoxysilane premix was employed in this example.

Thereafter, a high activity polymerization catalyst as also described in U.S. Pat. No. 5,098,969 in an amount of about 0.015 g was added to the slurry. This mixture was then reacted at a temperature of 25° C. for a period of about 0.1 hr. During this period of time, a sticky prepolymer of the alpha-olefin was being formed on the surface and in the pores of the filler material.

The reactor was then charged with a pressure drop of 20 psig from a 150 cc hydrogen vessel and propylene polymerization was conducted for one hour at a setpoint temperature of 83° C.

The resultant composites produced by the above process were essentially free of fines and the filler particles blended in the matrix of the composite were spherical in shape. The polymerization data for the various samples is illustrated in Table I.

Comparative Example I

In this comparative example, the same procedure as described in Example I was carried out except that no filler material was employed.

The polymerization data for this comparative example containing no filler material is shown in Table I. Generally, the reactor-filled polymers, which were produced in Example I, exhibited a higher bulk density and melt index compared to unfilled propylene polymers produced using no filler material. Furthermore, the activity of the reactor-filled polymers were slightly higher than the unfilled polymer.

EXAMPLES 16–23

Reactor-Filling During Ethylene Polymerization

Into a one liter autoclave was added 450 ml of heptane and the appropriate amount of an alpha olefin as described in Table 2. To this solution was added an appropriate amount of a filler material as specified in Table 2 and 1.0 mmol triethylaluminum. The filler materials employed in these examples were all dehydrated and deoxygenated prior to their use in the same manner as described in Example 1.

To this slurry was then added 0.040 g of a silica supported titanium catalyst as described in Example 1 of U.S. Pat. No. 4,374,753. Thereafter, the mixture containing the silica supported catalyst was then prepolymerized at a temperature of 25° C. for a period of about 0.1 hrs. During this period of time, a sticky prepolymer of the alpha olefin was formed on the filler material.

The reactor was then charged with a pressure drop of 20 psig from a 150 cc hydrogen vessel and ethylene polymerization was carried out in a 135 psig ethylene pressure for one hour at 90° C. The polymerization data using different fillers for these samples is shown in Table 2.

Comparative Examples 2–4

These comparative examples were carried out using the procedure as described in Examples 16–23, however, no filler materials were added during the ethylene polymerization reaction.

The results of these comparative examples for ethylene polymerization is illustrated in Table 2. As indicated previously, the reactor-filled polymers exhibit somewhat higher activity than the unfilled polymers. More importantly, however, is that the reactor-filled ethylene polymers produced by the inventive method have a higher bulk density than the unfilled polymer and in some instances the melt index of the composite was also improved.

EXAMPLE 24

Carbon black and titanium dioxide were used to reactor-fill polypropylene in a 5-gallon autoclave using a 50% solution of mixed α-olefins prepared according to U.S. Pat. No. 5,116,795. The polymerization was carried out for 1.5 hours at 75° C.

The results of this example are shown in Table 3. The resulting materials were granular, free of fines and did not spread or release filler on transporting and handling.

TABLE 1

| Example | Sample | Filler | Amount (g) | Alpha Olefin | Amount (ml) | gComposite gCatalyst | MI g/10 min | BD lb/ft$^3$ | % Fill |
|---|---|---|---|---|---|---|---|---|---|
| CE1 | A | None | None | Decene | 2.0 | 10280 | 10.9 | 14.5 | 0 |
| 1 | B | Talc | 10.0 | Decene | 2.0 | 10365 | 9.6 | 14.0 | 6.0 |
| 2 | C | Talc | 25.0 | Decene | 1.0 | 15325 | 16.0 | 19.2 | 9.6 |
| 3 | D | Talc | 25.0 | Decene | 1.0 | 13200 | 14.0 | 18.6 | 11.1 |
| 4 | E | Talc | 25.0 | Decene | 0.5 | 10970 | 10.4 | 22.1 | 13.4 |
| 5 | F | Talc | 25.0 | Decene | 2.5 | 11450 | 13.0 | 17.7 | 14.6 |
| 6 | G | Talc | 35.0 | Decene | 3.5 | 10525 | 15.0 | 19.6 | 20.8 |
| 7 | H | Mica | 10.0 | Decene | 3.0 | 9920 | 12.8 | 14.8 | 6.3 |
| 8 | I | Mica | 10.0 | Decene | 2.0 | 10850 | 8.5 | 18.8 | 5.8 |
| 9 | J | Mica | 10.0 | Decene | 1.0 | 10173 | 10.9 | 17.1 | 6.6 |
| 10 | K | Mica | 15.0 | Decene | 2.0 | 9810 | 11.5 | 19.0 | 9.6 |
| 11 | L | Mica | 25.0 | Decene | 2.0 | 11520 | 17.8 | 20.9 | 13.6 |
| 12 | M | Mica | 30.0 | Decene | 3.0 | 7931 | 8.3 | 20.5 | 23.6 |
| 13 | N | Glass Fiber | 5.0 | Decene | 1.0 | 7830 | 12.8 | 18.1 | 4.0 |
| 14 | O | Glass Fiber | 5.0 | Decene | 0.5 | 10300 | 11.6 | 17.8 | 3.2 |
| 15 | P | Graphite | 5.0 | Decene | 1.0 | 10250 | 13.1 | 18.0 | 3.2 |
| 16 | Q | Graphite | 5.0 | Decene | 2.0 | 14585 | 32.5 | 19.5 | 2.3 |
| 17 | R | Graphite | 10.0 | Decene | 2.0 | 13565 | 57.3 | 20.6 | 4.9 |

$^{a)}$In 250 g propylene, 1 hour polymerization 83° C., using equivalent amounts of hydrogen, heptane, catalyst, cocatalyst, and cocatalyst modifier in each run.

TABLE 2

| Example | Filler | Amount g | Alpha Olefin | Amount ml | gComposite gCat | B.D. lb/ft$^3$ | MI g/10 min | % Fill |
|---|---|---|---|---|---|---|---|---|
| CE 2 | 0 | 0 | Decene | 0.5 | 1040 | 19.3 | 2.0 | 0 |
| CE 3 | 0 | 0 | Decene | 1.0 | 1550 | 19.1 | 1.7 | 0 |
| CE 4 | 0 | 0 | Decene | 2.0 | 1370 | 18.5 | 4.3 | 0 |
| 18 | Talc | 25.0 | Decene | 2.5 | 1567 | 24.4 | 2.4 | 23.9 |
| 19 | Talc | 35.0 | Decene | 3.5 | 2000 | 19.6 | 2.4 | 31.2 |
| 20 | Mica | 25.0 | Decene | 2.0 | 1785 | 21.8 | 2.2 | 21.0 |
| 21 | Mica | 35.0 | Decene | 3.5 | 1880 | 20.2 | 0.67 | 33.2 |
| 22 | Graphite | 5.0 | Decene | 2.0 | 1365 | 21.2 | 2.6 | 9.0 |
| 23 | Graphite | 10.0 | Decene | 2.0 | 1760 | 24.6 | 1.5 | 14.2 |

$^{a)}$All run with equivalent amounts of heptane diluent, hydrogen, catalyst and cocatalyst at 90° C. and 135 psig for 1 hour

TABLE 3

| FILLER | gPP synthesized/g CAT | % FILL | MELT FLOW |
|---|---|---|---|
| TiO$_2$ | 4130 | 19.6 | NA |
| " | 3500 | 26.3 | 2.2 |
| " | 3085 | 28.8 | 2.0 |
| Carbon Black | 6450 | 14.5 | 2.5 |
| " | 4155 | 24.0 | 1.3 |
| " | 6205 | 15.6 | 1.5 |

The above embodiments and examples are given to illustrate the scope and spirit of the present invention.

These embodiments and examples will make apparent, to those skilled in the art, other embodiments and examples. These other embodiments and examples are within the contemplation of the present invention; therefore, the instant invention should be limited only by the appended claims.

What is claimed is:

1. A method to reactor-fill polyolefins useful for preparing a polyolefin composite having a uniform distribution of filler particles blended therein comprising the steps of:
   (a) adding a sufficient amount of an alpha-olefin to a filler such that a sticky prepolymer can be formed in-situ;
   (b) prepolymerizing the mixture of step (a) by contacting the mixture in random order of no specific sequence with a high activity polymerization catalyst, a cocatalyst, and, if necessary a cocatalyst modifier wherein said contacting causes the formation of a sticky prepolymer on the surface and in the pores of the filler; and
   (c) adding an alpha-olefin under olefin polymerization conditions to the reaction product of step (b) to cause formation of said reactor-filled composite.

2. The method of claim 1 wherein the filler material is a filler selected from the group consisting of mica, talc, $CaCO_3$, kaolin, $Mg(OH)_2$clay, diatomaceous earth, $CaSO_4$, fly ash, silica, glass spheres, glass fibers, polyvinyl alcohol, graphite, carbon black, titanium dioxide, aluminum, copper and the like.

3. The method of claim 2 wherein the filler material is kaolin, mica or talc.

4. The method of claim 1 wherein the alpha-olefin used in step (a) is at least one alpha-olefin having from two to eighteen carbon atoms.

5. The method of claim 4 wherein the alpha-olefin is decene.

6. The method of claim 1 wherein the amount of the alpha-olefin employed to prepolymerize the filler is from about 0.01 to about 10,000 μmole per gram of filler.

7. The method of claim 6 wherein the amount is from about 100 to about 1000 μmole of alpha-olefin per 1 gram of filler.

8. The method of claim 1 wherein the filler is dried to effectively remove surface hydroxyl groups from the surface of the filler.

9. The method of claim 8 wherein the filler is dried at 150° C. for about 24 hrs.

10. The method of claim 9 wherein the dried filler is deoxygenated by evacuating the system under full vacuum and then filling the system with moisture-free $N_2$ prior to the use thereof.

11. The method of claim 1 wherein the alpha-olefin employed in step (a) is solubilized in a hydrocarbon solvent.

12. The method of claim 11 wherein the hydrocarbon solvent is heptane.

13. The method of claim 1 wherein the prepolymerizing step is conducted at a temperature of about 0° to about 100° C. for a period of about 0.01 to about 24 hrs.

14. The method of claim 1 wherein the high activity catalyst comprises:
   (a) a pretreated inorganic or organic support material;
   (b) an organomagnesium compound;
   (c) at least one transition metal containing compound effective in alpha-olefin polymerization reactions; and, as appropriate,
   (d) an alcohol or a modifying compound.

15. The method of claim 14 wherein the support material is silica.

16. The method of claim 14 wherein the organomagnesium compound is selective from the group consisting of alkyls, alkoxides or aryls of magnesium or its complexes.

17. The method of claim 16 wherein the organomagnesium compound has one of the formulas:
$R^2MgX_1$;
$R'_2Mg$; and
$(R_2^2Mg)_nAlR_3^2$
wherein $R^1$ and $R^2$ are each independently alkyl or alkoxide containing from 1 to 12 carbon atoms, or aryls such as phenyl, naphthyl and cyclopentadienyl; n is 0.5–10; and $X_1$ is a halide.

18. The method of claim 17 wherein the organomagnesium compound is an alkoxymagnesium chloride.

19. The method of claim 14 wherein the transition metal compound(s) has the structural formula(s) $M''(OR')_x(O)_y(X^2)_z$ and/or $M'X^2_p(OR')_q$ wherein $M''$ is a metal of Group VB; $X^2$ is a halogen; $R'$ is aryl, alkyl, aralkyl, cycloalkyl or alkylsilyl; x is 0 or an integer from 1 to 5; y is 0 or an integer from 1 to 3; z=(5-x-2y) or 4 or 3 when x=0; y=0; $M'$ is a metal of Group IVB; and p and q range from 0 to 4 with the proviso that sum of p and q is 3 or 4.

20. The method of claim 19 wherein the transition metal compound has the formula $M'X^2_p(OR')_q$ wherein $M'$ is titanium; p is an integer from 2 to 4; q is 0 or an integer from 1 to 2 and $R'$ is chloride.

21. The method of claim 20 wherein p is 4 and q is 0.

22. The method of claim 14 wherein the alcohol is n-butyl alcohol.

23. The method of claim 14 wherein the modifying compound is a silane compound having the formula $SiH_rX_s^2$, where $X^2$ is halogen; r is 0 or an integer from 1 to 3; s is an integer from 1 to 4; with the proviso that the sum of r and s is 4.

24. The method of claim 23 wherein the silane compound is silicon tetrachloride.

25. The method of claim 1 wherein the cocatalyst is an aluminum-containing cocatalyst.

26. The method of claim 25 wherein the aluminum-containing cocatalyst is selected from the group consisting of trialkyl aluminum, alkyl aluminum halides and mixtures thereof.

27. The method of claim 26 wherein the aluminum-containing cocatalyst is a trialkyl aluminum compound.

28. The method of claim 27 wherein the trialkyl aluminum compound is triethylaluminum.

29. The method of claim 1 wherein the cocatalyst modifier is a hydrocarbyl alkoxysilane compound.

30. The method of claim 29 wherein the hydrocarbyl alkoxysilane is isobutyltrimethoxysilane.

31. The method of claim 1 wherein the alpha-olefin employed in step (c) contains from 2 to about 12 carbon atoms.

32. The method of claim 31 wherein the alpha-olefin is propylene or copolymers thereof.

33. The method of claim 1 wherein the alpha-olefin in step (c) is polymerized at a temperature of about 25° to about 250° C. under a pressure of about 0 to about 1000 psig.

34. A reactor-filled polyolefin composite which comprises a relatively uniform distribution of filler particles blended throughout the composite matrix.

35. The reactor-filled polyolefin composite of claim 34 wherein the filler particles are essentially spherical or fibrous in shape.

* * * * *